United States Patent [19]
Ohmae et al.

[11] Patent Number: 4,673,802
[45] Date of Patent: Jun. 16, 1987

[54] SYSTEM FOR MAKING PAYMENTS FOR TRANSACTIONS

[75] Inventors: Kenichi Ohmae, Yokohama; Kazuma Tateisi, Kyoto; Yoshitsugu Shinohara, Shiga; Nobuyuki Ueno, Nagaokakyo, all of Japan

[73] Assignee: Omron Tateisi Electronics Co., Kyoto, Japan

[21] Appl. No.: 921,821

[22] Filed: Oct. 21, 1986

Related U.S. Application Data

[63] Continuation of Ser. No. 582,910, Feb. 23, 1984, abandoned.

[30] Foreign Application Priority Data

Feb. 23, 1983 [JP] Japan ................................ 58-22925

[51] Int. Cl.4 ............................................ G06F 15/30
[52] U.S. Cl. .................................... 235/379; 235/380; 364/406
[58] Field of Search ................ 235/379, 380; 364/406

[56] References Cited

U.S. PATENT DOCUMENTS 3,852,571 12/1974 Hall et al. ............................ 235/379
4,321,672 3/1982 Braun et al. ...................... 235/379 X
4,472,626 9/1984 Frid ..................................... 235/379

Primary Examiner—David L. Trafton
Attorney, Agent, or Firm—Stevens, Davis, Miller & Mosher

[57] ABSTRACT

A transaction payment system including a central processing system. The central processing system has an account file including a file portion having stored therein data relating to the accounts of users and a file portion having stored therein data relating to the accounts of stores, and an outstanding transaction file for storing outstanding transaction data. The central processing system comprises a CPU for checking with the transaction data on the outstanding transaction file whether a predetermined period of indulgence has elapsed from the date of each transaction. The sum of transaction involving lapse of the indulgence period and included in the transaction data on the outstanding transaction file is withdrawn from the corresponding user account on the account file and stored in the corresponding store account thereon.

5 Claims, 15 Drawing Figures

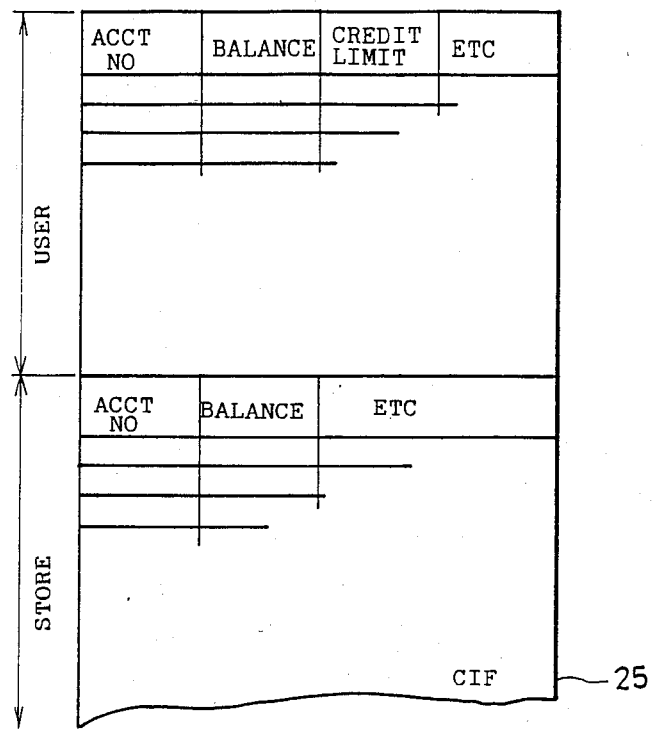

SYSTEM FOR MAKING PAYMENTS FOR TRANSACTIONS

This application is a continuation of application Ser. No. 582,910 filed Feb. 23, 1984, now abandoned.

BACKGROUND OF THE INVENTION

The present invention relates to a system for making payments for transactions with bank cards.

Bank cards are issued from a bank to those who have deposit accounts with the bank and can be used for performing cashless transactions. The stores which are members of a cashless transaction system wherein such bank cards are used are provided with a terminal transaction machine which is connected to the control center of the bank by a telephone (communication) line. The control center is provided with a customer information file having stored therein data relating to the accounts of the bank card users and to the accounts of the member stores. When the user has performed a transaction with a member store, the terminal transmits the bank card data and the sum of transaction to the center, where the sum of the transaction is withdrawn from the user's account and transferred to the account of the store concerned, whereby a payment is made for the transaction. According to the concept of the transaction payment system described above, the transaction and the payment are made at the same time, so that when the balance on the user's account is less than the sum of transaction, the sum is not payable. Consequently the user is refused the transaction with his bank card, failing to enjoy the benefit of a cashless transaction with use of the bank card.

SUMMARY OF THE INVENTION

The main object of the present invention is to provide a system for making payments for transactions wherein a period of indulgence is afforded between the transaction and the payment therefor to render the system useful for cashless transactions with bank cards and offer convenience to users.

The present invention provides a system for making payments for transactions which is characterized in that the system includes a contral processing system comprising an account file including a file portion having stored therein data relating to the accounts of users and a file portion having stored therein data relating to the accounts of stores, an outstanding transaction file for storing outstanding transaction data, means for checking the transaction data on the outstanding transaction file to determine whether a predetermined period of indulgence has elapsed from the date of each transaction, and transfer means for withdrawing the sum of a transaction which is associated with a lapse of the indulgence period and which is included in the transaction data on the outstanding transaction file, from the corresponding user account on the account file and adding the sum in the corresponding store account thereon.

The bank card is issued to one having a deposit account with a bank as already stated and has recorded therein the account number, the data relating the bank, etc. The transaction payment system of the present invention is useful for transactions of all goods ranging from foods to motor vehicles (and including intangible goods such as services). Accordingly the term "store" herein used refers to stores and supermarkets selling various usual goods, food and beverage stores such as restaurants, transport companies and the like offering services, etc. The term "user" means a person having a deposit account with the bank, possesses a bank card issued by the bank for the account and liable to make a payment to a store for the goods or service purchased from or given by the store.

Preferably each store has a transaction terminal connected to the central processing system by a telephone (transmission) line. The transaction terminal comprises at least a card reader for reading data from a bank card having recorded therein data relating to the account number of its bearer and data relating to the bank where the account is provided, means for entering data relating to the sums of transactions (such as a keyboard), transmission control means for transmitting the card data and the sum of a transaction to the central processing system and receiving from the central processing system data relating at least to whether the transaction is acceptable, display means for showing the data relating to the acceptability of the transaction, and means for printing data relating to the transaction when the transaction is acceptable. The outstanding transaction file stores the required items of data included in the card data and the sum of the transaction received from the transaction terminal. An electronic cash register is usable as the transaction terminal when additionally provided with a card reader and means for performing communications with the central processing system because the register already has a keyboard, display and printer. Since commercial transactions are handled usually with the use of electronic cash registers, the use of the register also as the transaction terminal assures convenience in handling transactions, while the total sum of transactions calculated by the cash register affords the sum of transaction to be paid.

When the transaction payment system of the present invention is used, the time for payment of a commercial transaction can be extended a predetermined period from the actual date of the transaction, hence providing a great convenience to the user. Conventionally an indulgence period of about 10 to 40 days is available for commercial transactions with use of credit cards. However, the credit card is under the control of the credit company, whereas the user has his account at the bank. The payments for transactions with use of credit cards therefore require cooperation between the credit company and the bank and an immense amount of clerical work. Nevertheless, according to the present invention wherein bank cards issued from the bank are used, payments can be executed only by the bank with extreme ease at a low cost.

The user account and the store account are not always provided at the same bank. Accordingly it is desired for the store to have accounts at as many banks as possible and to be a member of the transaction payment system supervised by these banks. However, even if the user has his account at one bank with the store account at another bank, payments can be made by transmitting transaction data from the center of one bank to the center of the other bank through a communication line interconnecting these centers. In this case, it will be preferable to use the outstanding transaction file at the center where the user account is opened rather than the one at the center having the store account, for storing the outstanding transaction data. Only when the sum payable is to be transferred, data including this sum is transmitted to the center having the store account, and the payment is made in this account. The transaction terminal of each store need not always be connected to the central processing system at the center of the bank. Also usable is a batch system wherein transaction data is periodically stored in the terminal or printed by the printer, and the collected data is brought to the bank, from the terminal of which the data is transmitted to the central processing system.

Other features of the present invention will become apparent from the following description of the invention.

BRIEF DESCRIPTION OF THE DRAWINGS

FIG. 4 partly shows a customer information file (CIF);

FIG. 5 partly shows an outstanding transaction information file (OIF);

FIG. 6 shows a message format;

DESCRIPTION OF THE PREFERRED EMBODIMENT

Figure 1:
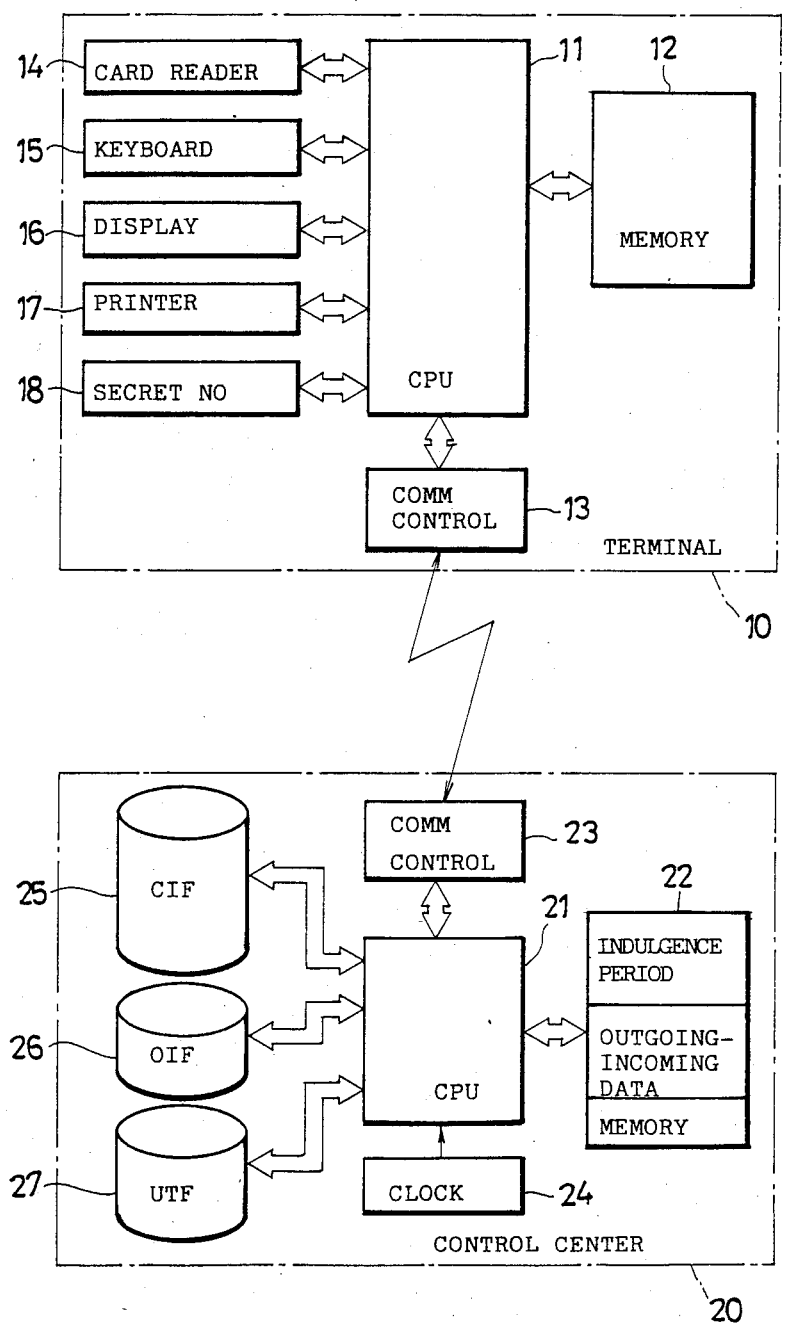
FIG. 1 is a block diagram showing a transaction payment system in its entirety.

FIG. 1 shows a system for making payments for transactions in its entirety which comprises a transaction terminal 10 installed at each store and a control center 20 at a bank, the terminal 10 being connected to the center 20 by a communication (telephone) line.

The terminal 10 is controlled by a CPU, such as microprocessor, 11. Connected to the CPU 11 are a memory 12 for storing a program therefor and various items of data to be described later, a communication control unit 13 for controlling communications with the center, a card reader 14 for reading the data magnetically recorded in a bank card BC, a keyboard 15 for entering transaction data including the sums of transactions, a display 16 for showing data as to the acceptability of transactions and other necessary data from the center 20, a printer 17 for printing transaction data on slips and journal and also for printing various data relating to payments, and a keyboard 18 with which the user enters his secret number. The communication control unit 13 includes an automatic dialing circuit and a modem. The card reader 14 may be of the automatic scanning type or of the manual scanning type. Instead of being incorporated in the terminal 10, the secret number keyboard 18 is preferably provided externally of the terminal 10 and connected thereto by a cable so as to be manipulated by the user.

The control center 20 is provided with a large-sized CPU 21 for controlling the communication with the terminals 10 and executing various transaction processes including a payment process. The CPU 21 is provided with a memory 22 for storing the program to be thereby executed, a communication control unit 23 for the communication with the terminals, a clock 24, a customer information file (CIF) 25, an outstanding transaction information file (OIF) 26 and an unpayable transaction file (UTF) 27.

Although FIG. 1 shows the terminal and the control center each singly, one bank has at least one control center which is adapted to communicate with the terminals 10 of all the member stores of the cashless transaction system supervised by the bank. Furthermore, the terminal of each store is adapted to communicate with the control centers of a plurality of banks.

Figure 2:
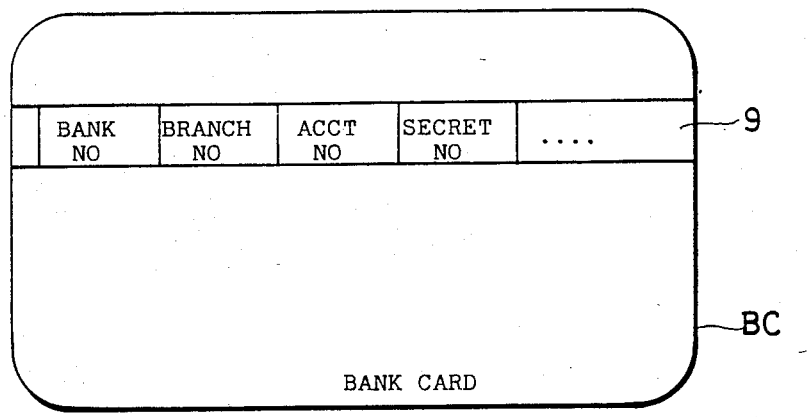
FIG. 2 shows a bank card.

The bank card BC is shown in FIG. 2. The bank card BC is issued from a bank to a person having an account with the bank. A magnetic stripe 9 affixed to the card BC has magnetically recorded therein a bank number representing the issue bank, a branch number, the account number and secret number of the bearer of the card and other data. When required, the credit limit may be recorded in the card.

Figure 3:
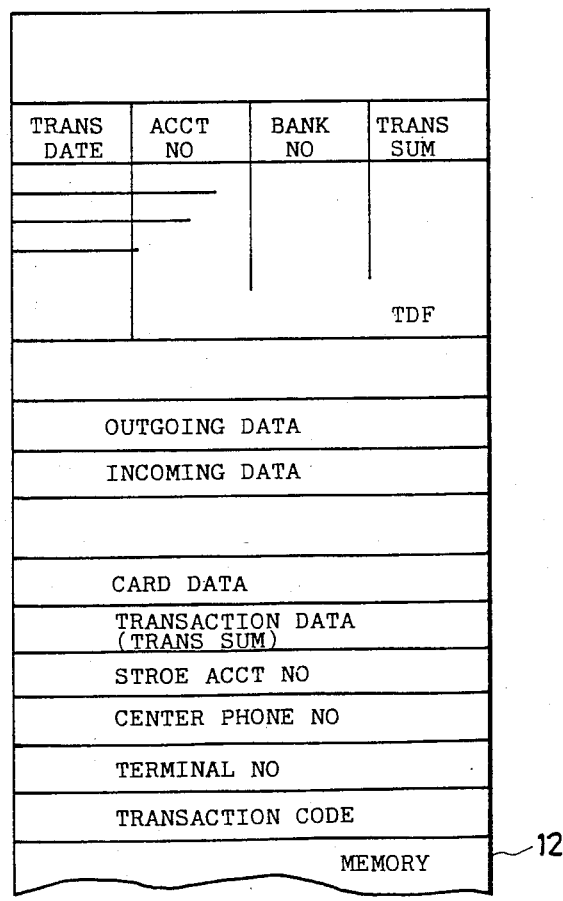
FIG. 3 partly shows a memory in a transaction terminal.

FIG. 3 shows the arrangement of data in the memory 12. The memory has an area serving as a transaction data file (TDF), areas serving as outgoing and incoming data buffers for communication with the center 20, an area for storing card data read by the card reader 14, an area storing keyed-in sums of transactions, etc., an area for storing the account number of the store where the terminal is installed, an area storing the telephone number of the center of the bank concerned, an area storing the identification number of the terminal 10, an area storing transaction codes for use in the messages to be sent to the center, etc.

The TDF is used for storing the data as to each transaction performed by the terminal until the payment therefor has been completed. The data to be stored includes the date of the transaction, the account number of the user performing the transaction, bank number and the sum of the transaction.

When the store has accounts at a plurality of banks, the memory 12 has stored therein the account numbers at these banks in corresponding relation thereto. Further there is a need to store the telephone numbers of the bank centers in corresponding relation to the identification numbers, e.g. the bank numbers, of the banks, individually.

The memory 22 at the center 20 has an area serving as an incoming-outgoing data buffer for communication with the terminal 10 and has a predetermined period of indulgence stored therein (see FIG. 1). The term "indulgence period" means an extension of time from the data of transaction and is usually about 10 to 40 days. While a definite indulgence period is set by the center 20 for all transactions according to the present embodiment, a specified period can be set by the terminal, or an optional period can be set within certain limits as desired by the user. In this case, the indulgence period set by the terminal is transmitted to the center along with the transaction data.

FIG. 4 shows an example of CIF 25 held by the center 20. For each of the users and the stores having an account with the bank, the CIF 25 has stored therein the deposit balance, name, address and like data relating to transactions, in corresponding relation to the account number concerned. Also stored is the credit limit for each user. With the present embodiment, the credit limit is predetermined in view of the financial standing of the individual involving the annual income, his employer, period of service with the employer and other personal situations. It will of course be possible to predetermine the credit limit according to the sum of deposit (balance) or the like, periodically or for every transaction.

FIG. 5 shows an example of OIF 26 at the center 20. The OIF 26 is adapted for storing the outstanding transaction data forwarded from each terminal 10 and including the date of payment, date of transaction, account number of the user, sum of transaction and a symbol representing the store performing the transaction (e.g. store number, terminal number, account number or the like), such data being stored for each transaction. When the store has accounts at other banks, it will be necessary to store the bank numbers, etc. of the banks. The date of payment is calculated by adding the indulgence period to the date of transaction.

The UTF 27 at the center 20 is adapted to store data as to the transactions which are unpayable because the sum of transaction of the user is in excess of his deposit balance at the date of payment as will be described later. Such risk is assumed by the bank although an arrangement may be made in advance between the bank and the store as to the assumption of the risk.

The center 20 has stored in one of its files or in the memory 22 a table wherein the account number of each store and the number of the terminal installed therein are given in corresponding relation to the store (store number or store name).

FIG. 6 shows an example of format of messages containing the transaction data to be sent from the terminal 10 to the center 20. The message comprises start of text (STX), number of the transmitter terminal, transaction code indicating outstanding transaction data, account number of the store, sum of transaction, bank number, branch number and user account number read from the bank card BC, and end of text (ETX). When required, the message contains the date of transaction and, when the store has accounts at other banks only, the bank numbers, etc.

FIGS. 7 to 11 show the transaction processing procedure to be executed by the terminal 10, and FIGS. 12 to 15 the transaction processing procedure to be executed by the control center 20.

Figure 7:
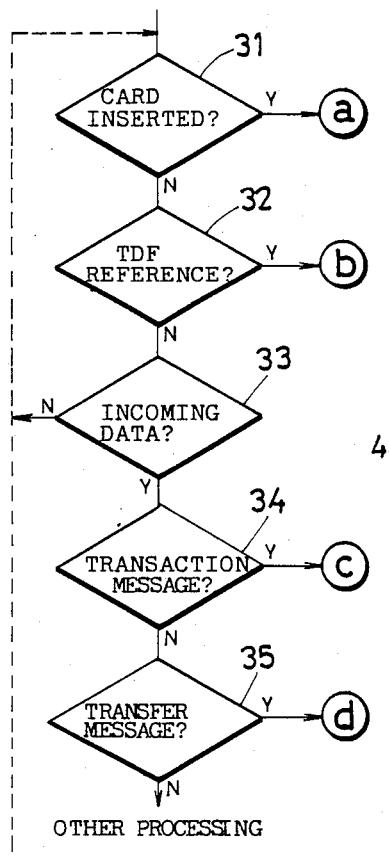
FIGS. 7 to 11 are flow charts showing the process to be executed by the terminal.

With reference to FIG. 7, the CPU 11 of the terminal successively checks whether the bank card BC was inserted into or scanned by the card reader 14 (step 31), whether reference to TDF was requested (step 32) and whether some message was received from the control center 20 (step 33). The CPU 11 may be informed of the results by an interruption. The detection of the insertion of the card means start of transaction processing. The reference to TDF means to read outstanding transaction data from the TDF of the memory 12 and print the data on the journal by the printer 17. The keyboard 15 has a TDF reference key, which, when depressed, gives an affirmative answer to the interrogation of step 32. When some message is received from the control center 20, the incoming data is stored in the incoming data buffer area of the memory 12 (step 33). The message is checked as to whether it relates to a transaction (step 34) or to the transfer of the sum payable (step 35).

Figure 8:
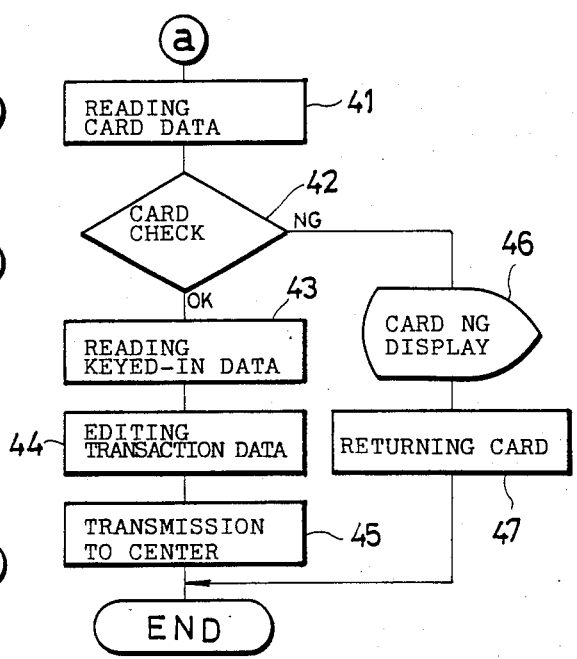

Reference is now made to FIG. 8 showing the first half of the transaction processing procedure at the terminal. When the insertion or scanning of the bank card BC is detected, the data recorded in the card is read and stored in the memory 12 (step 41). The card data format is checked to detect whether the bank card is genuine (step 42). When required, the user enters his secret number with the keyboard 18. The keyed-in secret number is checked for a match with the secret number on the band card. The center 20 may have stored in the CIF 25 the secret number in corresponding relation to the user account number, and the keyed-in secret number may be sent to the center along with the transaction data for the center to check the two secret numbers for a match.

In any case, when the bank card is found to be valid with a match obtained, the attendant at the store keys in transaction data, e.g. the sum of transaction, which is then read and stored in the memory 12 (step 43). A message such as the one shown in FIG. 6 is edited in the outgoing data buffer of the memory 12 (step 44). The communication control unit 13 automatically dials the center 20 with reference to the telephone number in the memory 20 (step 45). Even if there are a plurality of centers (banks), the telephone numbers of the centers are stored in the memory in corresponding relation to the reference symbols (e.g. bank numbers or codes) identifying the banks, such that the telephone number of the center concerned is retrieved with reference to the bank number in the card data or to the keyed-in bank code for the unit 13 to automatically dial the desired center.

If the bank card is not genuine or valid or if the secret numbers are not in a match (NG to step 42), the result is shown on the display 16 (step 46), and the card is returned (step 47). This is followed by re-insertion of the card to repeat the above steps or execution of the transaction with payment in cash.

When the transaction data is sent from the terminal to the center, the center registers the data in the OIF as will be described below. A message showing the result is then sent to the terminal. Receipt of the message by the terminal (steps 33 and 34) is followed by the second half of the transaction processing shown in FIG. 10.

Figure 10:
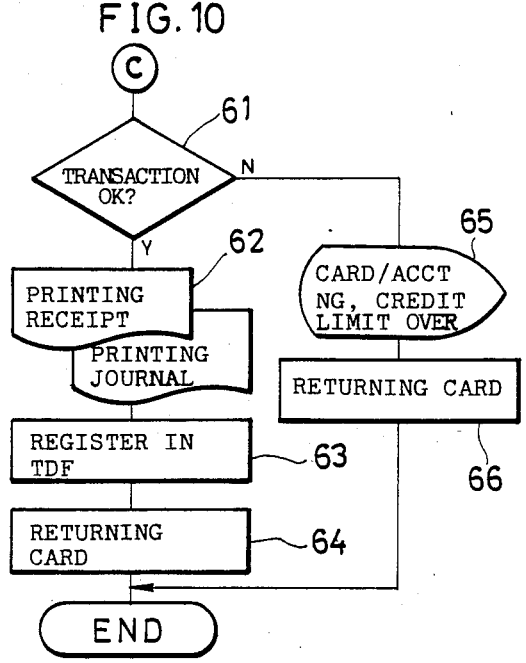

With reference to FIG. 10, the message sent from the center and stored in the incoming data buffer of the memory 12 is read out to check whether the transaction is acceptable (step 61). If the transaction can be performed, the printer 17 prints the transaction data, such as date of transaction, sum of transaction, user account number (or his identification code), etc., on a slip (receipt) and on the journal, and the embossment on the bank card is imprinted (step 62). The transaction data is registered on the TDF in the memory 12 (step 63) as described above. Finally the card is returned (step 64). The receipt issued and the card returned are delivered to the user. The journal serves as a record for the store. In this way, the transaction is completed without delivery of any cash.

The transaction is unacceptable, for example, if the bank card is invalid, or the account is absent from the CIF, or the sum of transaction is in excess of the credit limit. If the transaction is unacceptable ("NO" for step 61), such reason, which is contained in the message sent to the terminal from the center, is shown on the display 16 (step 65), and the card is returned (step 65). In this case, the transaction will be conducted with cash.

Figure 12:
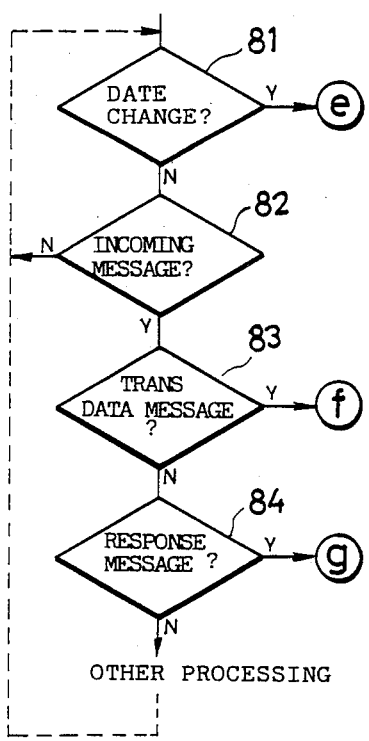
FIGS. 12 to 15 are flow charts showing the process to be executed by a control center.
Figure 15:
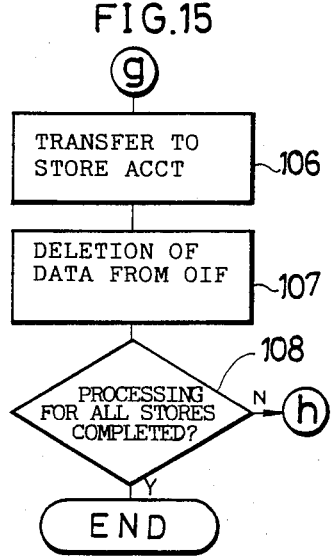

With reference to FIG. 12, the CPU 21 of the center 20 checks whether there is a change in the date (step 81) and then whether some message is received from the terminal (step 82). These steps may be executed by an interruption. The date is controlled by the clock 24. At a specified time when the date is to be changed, the clock 24 feeds a date change signal to the CPU 21 (step 81), whereupon the payment process shown in FIG. 13 (and to be described later) is executed. This process is performed once daily. The messages from the terminal include transaction data messages and responses (steps 83 and 84).

When containing a transaction code, the message from the terminal is a transaction data message. The sequence then proceeds to the transaction process shown in FIG. 14 (step 83). The message, which is stored in the incoming data buffer area in the memory 22, is read out to check whether the card is invalid because of some trouble (step 111). The center 20 has an invalid card file (not shown). The file has stored thereon the identification symbols (such as account numbers) of invalid cards which are not usable for transactions. The invalid card file is searched with reference to the card data forwarded from the terminal to check whether the symbol identifying the card concerned is on the file. Unless the card is invalid, the CIF 25 is then searched for the account number concerned (step 112). The sum of transaction is further checked whether it is in excess of the credit limit (step 113). The CIF 25 may have also stored therein the oustanding sums for the users, such that when the credit limit is to be checked, the sum of transaction is compared with the balance obtained by subtracting the outstanding sum from the credit limit.

In any case, the transaction is acceptable if the sum of transaction is up to the credit limit. The transaction data for the user is registered in the OIF 26 (step 117). In this step, the date of payment is calculated by adding the indulgence period to the date of transaction, and the date of payment is also registered in the OIF 26. A transaction OK (acceptable) code is set on the outgoing data buffer in the memory 22 (step 118).

If the card concerned is found to be on the invalid card file by step 111, a card NG code is set on the outgoing data buffer in the memory 22 (step 114). If step 112 fails to locate the account concerned on the CIF 25, an account NG code is set on the buffer (step 115). Further if the sum of transaction is found to be in excess of the credit limit by step 113, a credit limit over code is set on the buffer (step 116).

In any case, a transaction message is edited by adding the transaction data to the codes relating to the acceptability of the transaction and set in the outgoing data buffer (step 119). The message is sent to the terminal 10 concerned (step 120).

Upon receipt of this message, the terminal 10 executes the second half of the transaction processing procedure shown in FIG. 10.

Figure 13:
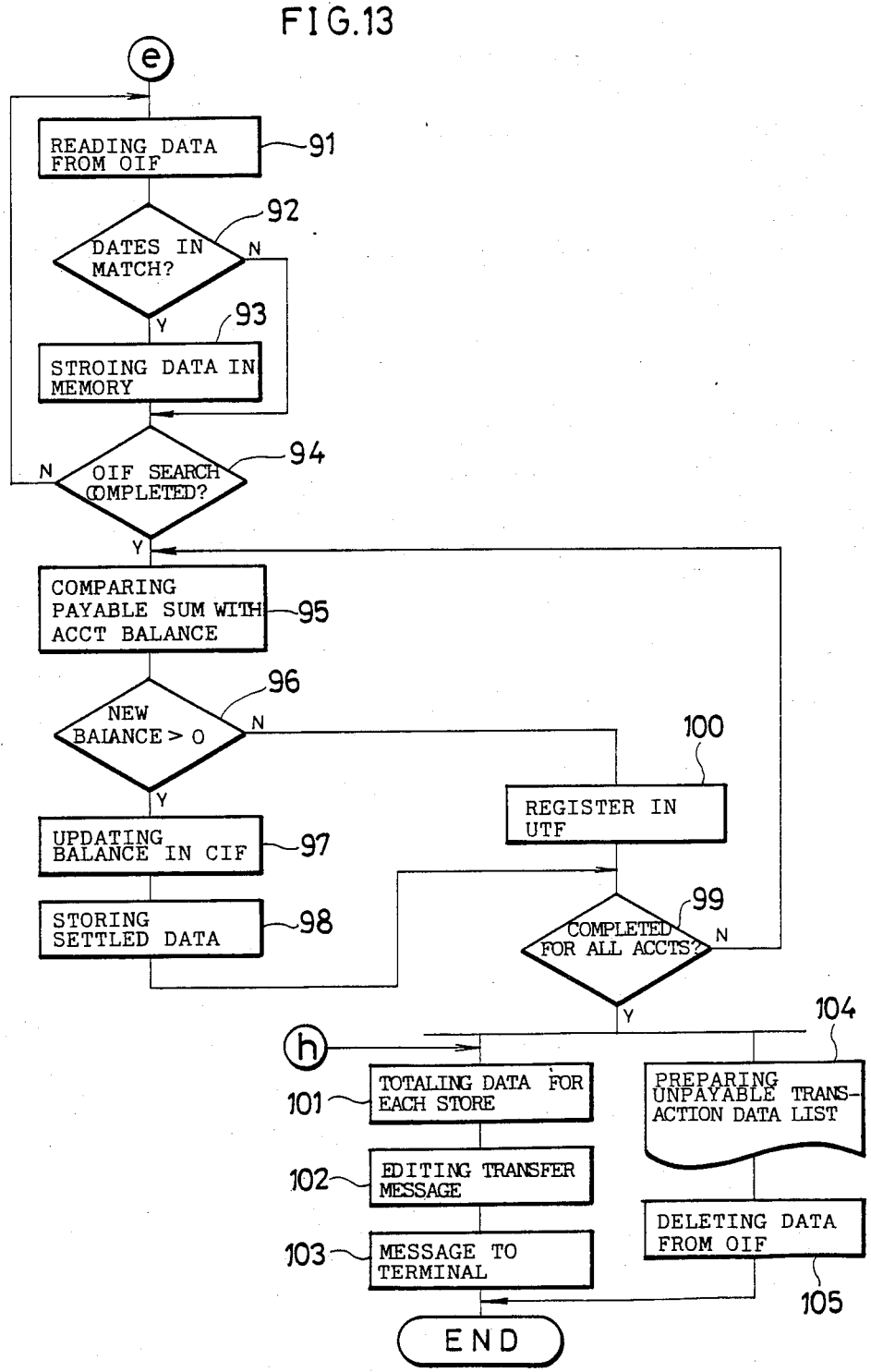
Figure 14:
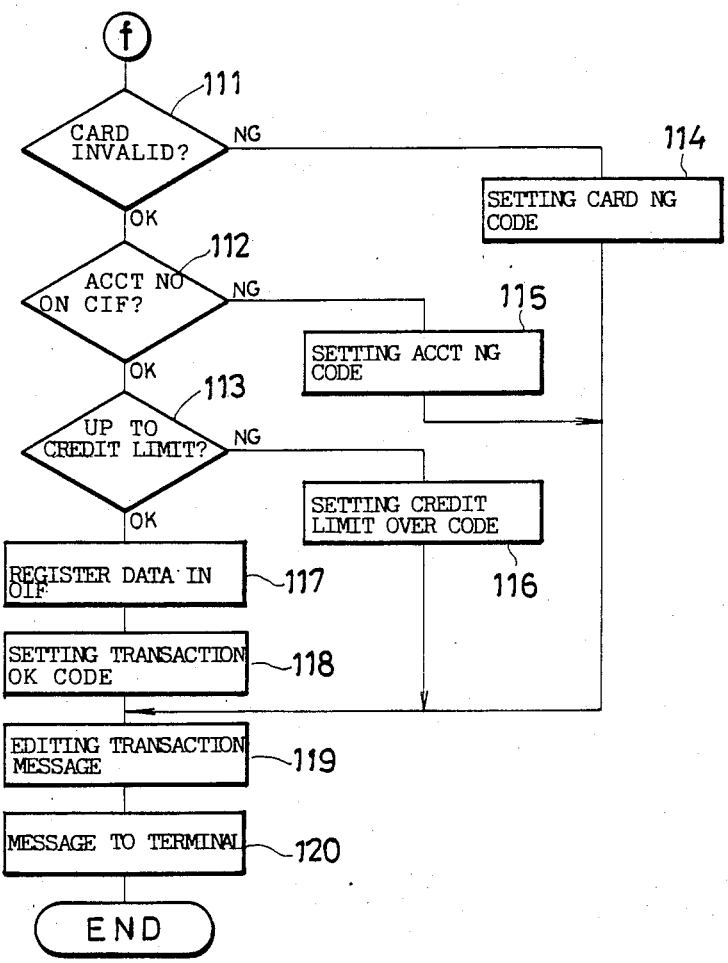

FIG. 13 shows the payment process to be executed by the center 20. First, the outstanding data as to one transaction is read from the OIF 26 (step 91) to check whether the date of payment included in the data matches the date on the clock 24 (step 92). If a match is obtained, the data is stored in the specified area in the memory 22 (e.g. outstanding data area). (Step 93.) These steps are repeated for the data as to every transaction on the OIF 26 (step 94). The data to be processed on the day concerned is read from the OIF 26 by steps 91 to 94.

Next, each of the transactions covered by the outstanding transaction data stored in the memory is handled to compare the sum of transaction to be paid and included in the data with the balance of the corresponding user on the CIF 25 (step 95). If the new balance obtained by subtracting the sum of transaction from the outstanding balance is zero or larger, the sum is payable (step 96). The balance on the user account is updated with use of the new balance (step 97). This means that the user has paid the sum of transaction due. The settled transaction data is stored in a specified area (settled data area) in the memory (step 98).

The new balance, if minus, indicates that the sum due is unpayable. The transaction data is then registered on the unpayable transaction file (UTF)(step 100). Preferably the balance on the user account concerned is updated by the negative new balance. Furthermore, the unpayable sum of transaction is stored in a specified area in the memory 22. At any rate, the bank will notify the user of the unpayable sum to collect the deficit.

The steps 95 to 98 and 100 are performed for the data of every transaction stored in the outstanding data area in the memory 22 (step 99).

When withdrawals are made from users' accounts for the data of all transactions to be paid, the sums will be transferred to the account of the stores concerned. With reference to the data in the settled data area in the memory 22, the sum to be transferred to each store (total of sums of transactions) is calculated (step 101). To the transfer sum is added the sum of unpayable transaction. A message is then edited which contains the totaled sum of to be transferred (including detailed data as to all settled transactions when required). The message is sent to the terminal of the corresponding store (steps 102 and 103).

Figure 11:
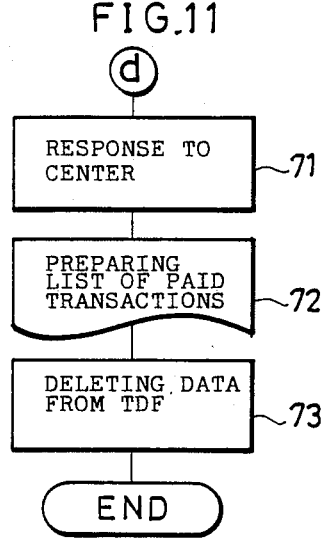

Upon receipt of the transfer message, the terminal 10 edits a response message to that effect, which is sent to the center 20 (FIG. 7, step 35 and FIG. 11 step 71). The center 20 now performs the transfer steps shown in FIG. 15. (The sequence proceeds from FIG. 12, step 84 to FIG. 15.) The totaled sum of transfer is then transferred to the account of the corresponding store (step 106), whereby the payment is completed. The outstanding data as to the transactions performed by the user at the store concerned is therefore deleted from the OIF 26 (step 107). The totaling and transfer steps 101 to 103, 106 and 107 for each store are executed for all the stores (step 108).

Although the terminal 10 transmits in step 71 (FIG. 11) a message merely stating that the transfer message has been received, a more reliable result can be achieved if such a response message is given to the center 20 only when the transfer sum (and all transaction data when required) forwarded from the center 20 is in a match with the total in the corresponding data on the TDF in the memory 12 of the terminal 10. Further after the sum has been transferred to the store account in step 106 of FIG. 15, the store may be informed of the transferred sum (this corresponding to step 103). If the store account is located not on the CIF of the center but in another bank, the required data including the transfer sum, store account number, etc. is sent to the center of the corresponding other bank for transfer.

Concurrently with, or after or before such transfer procedure, the data relating to unpayable transactions on the file 27 is printed (FIG. 13, step 104). The bank collects the unpaid money with reference to the printed data, and deletes the corresponding transaction data from the OIF 26 (step 105). The deletion of the data from OIF 26 may be done after the unpaid money has been collected.

With reference to FIG. 11, the terminal 11 receives data as to transfer sum, etc. from the center 20, whereupon the terminal prepares a list of paid transactions (with transferred payment), with reference to the received data or to the TDF in the memory 12 and also prints the list with the printer 17 (step 72). The settled data is deleted from the TDF (step 73).

Figure 9:
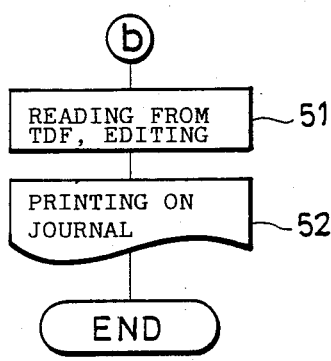

FIG. 9 shows the reference procedure to be executed by the terminal. Upon request for reference, outstanding data is read from the TDF in the memory 12 and edited (step 51) and is printed on the journal by the printer 17 (step 52). The journal gives the store information as to the outstanding transactions.

Although the account number only is used as the user identifying symbol according to the embodiment described, the name, bank card number, member number or the like is of course usable alternatively. Such data may be recorded or stored on the bank card, CIF or the like. The same is true of the store. Generally the center is provided with a transaction record file for recording all the transactions executed to guard against the possible accidents. Although no reference is made to the record file in the foregoing description, such a file is of course actually necessary.

What is claimed is:

1. A system for making payments for transactions, comprising:
   (a) a plurality of transaction terminals each having:
   (i) a card reader for reading data from a bank card having recorded therein data relating to an account number of its user and data relating to a bank where the account of the user is provided,
   (ii) means for entering data relating to sums of transactions, and
   (iii) means for setting an account number of a store, and
   (b) a central processing system operatively connected with said transaction terminals and having:
   an account file including a file portion having stored therein data relating to the accounts of users and a file portion having stored therein data relating to the accounts of stores,
   an outstanding transaction file for storing outstanding transaction data for at least a predetermined period of indulgence, said outstanding transaction data including sums of the transactions, account numbers of users, account numbers of stores provided by said transaction terminals and data relating to the transactions,
   means for checking the transaction data on the outstanding transaction file to determine whether the predetermined period of indulgence has elpased from the data of each transaction, and
   transfer means for withdrawing a sum of a transaction, which is associated with a lapse of the indulgence period, from the corresponding user account on the account file and adding the sum in the corresponding store account.

2. A system as defined in claim 1 wherein the user account file portion and the store account file portion are provided at the control center of the same bank.

3. A system as defined in claim 1 wherein the user account file portion and the store account file portion are provided at the control centers of different banks respectively.

4. A system as defined in claim 1 wherein each of the transaction terminals is connected to the central processing system by a transmission line, each of the terminals further comprising:
   transmission control means for transmitting said data from the card, the sums of the transactions and the account numbers of stores to the central processing system and receiving from the central processing system data relating at least to whether the transaction is acceptable,
   display means for showing the data relating to the accetability of the transaction, and
   means for printing data relating to the transaction when the transaction is acceptable.

5. A system as defined in claim 4 wherein the terminal is an electronic cash register.

* * * * *

UNITED STATES PATENT AND TRADEMARK OFFICE
CERTIFICATE OF CORRECTION

PATENT NO. : 4,673,802
DATED : June 16, 1987
INVENTOR(S) : Kenichi OHMAE et al

It is certified that error appears in the above-identified patent and that said Letters Patent is hereby corrected as shown below:

Title page:

Under "[30] Foreign Application Priority Data",

"58-22925" should read -- 58-29925 --.

Signed and Sealed this

Twentieth Day of October, 1987

Attest:

DONALD J. QUIGG

*Attesting Officer*   *Commissioner of Patents and Trademarks*